United States Patent
Flocke (12)

(10) Patent No.: US 10,682,711 B2
(45) Date of Patent: Jun. 16, 2020

(54) METHOD FOR MACHINING THE INTERIOR OF A BRAKE CALIPER OF A DISC BRAKE

(71) Applicant: BPW Bergische Achsen KG, Wiehl (DE)

(72) Inventor: Alexander Flocke, Overath (DE)

(73) Assignee: BPW Bergische Achsen KG, Wiehl (DE)

(*) Notice: Subject to any disclaimer, the term of this patent is extended or adjusted under 35 U.S.C. 154(b) by 0 days.

(21) Appl. No.: 16/323,788

(22) PCT Filed: Aug. 8, 2017

(86) PCT No.: PCT/DE2017/100668
§ 371 (c)(1),
(2) Date: Feb. 7, 2019

(87) PCT Pub. No.: WO2018/033178
PCT Pub. Date: Feb. 22, 2018

(65) Prior Publication Data
US 2019/0210121 A1    Jul. 11, 2019

(30) Foreign Application Priority Data

Aug. 16, 2016    (DE) .................. 10 2016 115 176

(51) Int. Cl.
*B23C 3/00*    (2006.01)
*B23Q 3/157*    (2006.01)
(Continued)

(52) U.S. Cl.
CPC ............. *B23C 3/00* (2013.01); *F16D 55/22* (2013.01); *F16D 55/226* (2013.01);
(Continued)

(58) Field of Classification Search
CPC ............. B23C 2215/08; B23C 2270/18; Y10T 409/304424; Y10T 409/303752;
(Continued)

(56) References Cited

U.S. PATENT DOCUMENTS 4,790,221 A * 12/1988 Iwata ................ B23B 29/03446
409/132
5,788,022 A     8/1998 Antony
(Continued)

FOREIGN PATENT DOCUMENTS

CN    206824729 U * 1/2018
DE        237 807    7/1986
(Continued)

*Primary Examiner* — Erica E Cadugan
(74) *Attorney, Agent, or Firm* — Gudrun E. Huckett

(57) ABSTRACT

The invention relates to a method for machining the interior of a brake caliper (1) of a disc brake, on which are formed: —a first saddle portion to the one side of the brake disc of the disc brake, —a second saddle portion to the other side of the brake disc, and —a bridge section connecting the saddle portions and providing a free space for at least a part of the brake disc. At least one of the saddle portions is provided with a hollow space (7) for receiving a brake application device, wherein said hollow space comprises a mounting opening (4) towards the free space and extends in the opposite direction until a saddle rear wall (18). At least one support surface for the forces acting during the brake application is formed on the inner side of the saddle rear wall. The machining of the support surface (20) is carried out from the direction of the free space and, for this purpose, a tool (55) is brought from outside of the brake caliper (1) into the hollow space. In order to provide a method for machining the interior of a brake caliper of a disc brake, which allows a high-precision machining of the support surfaces inside the brake caliper even in the case of the narrow space conditions which are typical for the machining (Continued)

of a single-piece brake caliper, the tool (55) is guided into the cavity through another opening (25) than the mounting opening (4).

16 Claims, 5 Drawing Sheets

(51) Int. Cl.

| | | |
|---|---|---|
| *F16D 65/18* | (2006.01) | |
| *F16D 55/22* | (2006.01) | |
| *F16D 55/226* | (2006.01) | |
| *F16D 65/00* | (2006.01) | |
| *F16D 55/00* | (2006.01) | |
| *F16D 121/14* | (2012.01) | |
| *F16D 125/32* | (2012.01) | |
| *B23Q 3/155* | (2006.01) | |

(52) U.S. Cl.
CPC ......... *F16D 65/0068* (2013.01); *F16D 65/18* (2013.01); *B23C 2215/08* (2013.01); *B23C 2270/18* (2013.01); *B23Q 2003/155407* (2016.11); *F16D 2055/002* (2013.01); *F16D 2055/0016* (2013.01); *F16D 2121/14* (2013.01); *F16D 2125/32* (2013.01); *F16D 2250/00* (2013.01); *F16D 2250/003* (2013.01); *Y10T 29/49989* (2015.01); *Y10T 29/49995* (2015.01); *Y10T 409/303752* (2015.01); *Y10T 409/304424* (2015.01); *Y10T 483/10* (2015.01); *Y10T 483/1736* (2015.01)

(58) Field of Classification Search
CPC ..... Y10T 409/303808; Y10T 29/49995; Y10T 29/49996; Y10T 29/49989; B23Q 3/155–3/15793; B23P 17/00; B23P 17/02
USPC ...... 409/143, 131–132; 451/61; 29/557–558, 29/527.6
See application file for complete search history.

(56) References Cited

U.S. PATENT DOCUMENTS

| | | |
|---|---|---|
| 5,927,445 A | 7/1999 | Bieker et al. |
| 6,183,404 B1 * | 2/2001 | Deufel .................. B23Q 3/157 483/1 |
| 6,338,705 B1 * | 1/2002 | Cavallo .................. B23P 23/02 29/26 A |
| 8,899,386 B2 | 12/2014 | Baumgartner et al. |
| 9,188,178 B2 * | 11/2015 | Ishiguro ................ F16D 65/005 |
| 2002/0014376 A1 * | 2/2002 | Ortegren ................ F16D 65/183 188/73.31 |
| 2011/0127120 A1 | 6/2011 | Stumpf et al. |
| 2019/0186566 A1 * | 6/2019 | Howard ................ F16D 55/226 |

FOREIGN PATENT DOCUMENTS

| | | |
|---|---|---|
| DE | 195 07 308 | 9/1996 |
| DE | 195 15 063 | 2/1997 |
| DE | 10 2007 001 960 | 7/2008 |
| DE | 10 2012 004 605 | 9/2013 |
| EP | 1 160 480 | 12/2001 |
| EP | 1 881 472 | 1/2008 |
| EP | 2 304 261 | 2/2010 |
| JP | 54-120371 A * | 9/1979 |
| JP | 04-181031 A * | 6/1992 |
| JP | 2004-353850 A * | 12/2004 |
| JP | 2009-228729 A * | 10/2009 |
| JP | 2014-061583 A * | 4/2014 |
| KR | 101383442 B1 * | 4/2014 |
| KR | 101508121 | 4/2015 |
| WO | 2007/077206 | 7/2007 |

\* cited by examiner

METHOD FOR MACHINING THE INTERIOR OF A BRAKE CALIPER OF A DISC BRAKE

BACKGROUND OF THE INVENTION

The invention concerns a method for machining the interior of a brake caliper of a disc brake on which are formed: a first caliper portion on the one side of the brake disc of the disc brake; a second caliper portion on the other side of the brake disc; and a bridge portion connecting the caliper portions and providing a free space for at least a part of the brake disc. At least one of the caliper portions is provided with a cavity for receiving a brake application device, which cavity comprises a mounting opening towards the free space and extends in the opposite direction as far as a caliper rear wall, on the inner side of which at least one support surface is formed for the forces acting during the brake application, wherein the machining of the support surface is carried out from the free space, and for this purpose, a tool is brought into the cavity from outside the brake caliper. Such a brake caliper is composed of a caliper portion on one side of the brake disc of the disc brake, a caliper portion on the other side of the brake disc, and a bridge portion which connects the two caliper portions and, when the disc brake is mounted ready for use, bridges the disc brake on the outside and provides a free space into which the brake disc of the disc brake at least partially protrudes. At least one of the two caliper portions has a cavity with an opening pointing towards the free space, wherein a brake application device is located in the cavity.

Such brake calipers are known in the prior art both as a one-piece or integral design, and also as a multipiece design. In principle, the multipiece design has the advantage of offering easier access to individual brake caliper regions for machining, e.g. by means of boring or milling tools. Above all, with the multipiece design, cavities in the brake caliper can be reached relatively easily during production, as can the connecting surfaces at which the individual caliper parts are then joined together, e.g. by corresponding bolt joints. This connection is however also disadvantageous since the caliper parts must be connected together with a precise fit in a separate assembly process.

The problems of assembly and fit do not arise with a one-piece brake caliper. However, the one-piece design restricts the possibilities of accessing certain locations, above all in the cavities of the brake caliper housing, by means of boring or milling tools. The surfaces in the interior of the brake caliper which must always be machined include support surfaces which receive the forces acting on application of the brakes. Thus, for example, brake calipers for disc brakes are known in which, to increase the force, a lever is arranged in the cavity of the brake caliper and bears pivotably against the caliper rear wall of the brake caliper which is formed correspondingly stable. Machining by material removal is usually essential at this bearing site.

For machining such support surfaces, DE 195 15 063 C2 discloses introducing the machining tool into the interior of the caliper through a specifically provided working opening on the side of the caliper. The disadvantage with this working opening is that it serves solely to guide the machining tool through, while in operation of the disc brake the opening has no purpose.

In the brake caliper described in DE 10 2007 001 960 A1, again a tool for machining the portion faces is introduced into the interior of the brake caliper through openings present on the side of the brake caliper housing, in order to machine the support surfaces situated therein. These openings however have an additional function. They are not merely working or mounting openings, but also serve as support bearings for a bolt which is part of the brake application device.

According to EP 1 881 472 A1, a further one-piece brake caliper is provided with a machining opening which is aligned to a hydraulic actuating cylinder for machining of the actuating cylinder. This opening is configured as a type of recess and is situated in the opposite caliper portion of the brake caliper arranged on the other side of the brake disc.

The generic EP 2 304 261 B1 discloses a method for producing an integral brake caliper, in which the brake caliper without an additional working opening is produced. The only opening is the mounting opening of the brake caliper which is open towards the brake disc and through which the application device can be mounted. A tool holder with tool arranged thereon can be moved through this opening into the cavity of the brake caliper. For this movement, since the tool holder is L-shaped and the bridge portion is relatively short in the caliper longitudinal direction, a superposed movement sequence is required, wherein the tool holder either initially performs a rotation about a virtual axis lying in the brake caliper plane and then performs a straight movement, or the tool holder first performs an obliquely angled and then a straight movement. Superposed movement sequences require corresponding movement options. Each movement option is however associated with a further bearing play, which may adversely affect the precise machining of the support surfaces.

The invention is therefore based on the object of creating a method for machining the interior of a brake caliper of a disc brake which allows high-precision machining of the support surfaces in the interior of the brake caliper even under the constricted spatial conditions typical for machining of a one-piece brake caliper.

SUMMARY OF THE INVENTION

This object is achieved in that, to machine the support surface, a tool is brought into the cavity from outside the brake caliper such that the tool is guided into the cavity through an opening other than the mounting opening.

With this solution, the tool passes into the cavity of the brake caliper through an opening through which the associated tool holder could not pass. Instead, the tool on one side and the tool holder on the other reach the region of the brake caliper, in which the interior machining of the caliper is to take place, via different routes. Only the tool itself enters the cavity, i.e. the interior of the brake caliper, through the opening which is not the mounting opening. The tool holder however is brought into a position suitable for subsequent machining of the support surface in another way relative to the position of the brake caliper. Only then is the tool holder fitted with the tool which has been introduced through the additional opening, so that then the machining of the support surface can begin.

Conversely, after completing the machining, the tool can be withdrawn again from the interior of the brake cavity through the same opening, i.e. through the additional opening.

Since the machining tool, which may e.g. be a milling cutter or a boring head, reaches the region of the interior of the brake caliper by a different route from the associated tool holder, the movement sequence (where relevant to the production precision) is simple. No additional movement options with associated additional bearing play are required, whereby highly precise machining of the support surfaces in the interior of the brake caliper is possible.

The opening through which the tool is guided into the interior of the brake caliper indeed constitutes an additional opening in the brake caliper. It may be located however at a site, for example in the caliper rear wall, where such an opening may perform a second functionality, and in particular a functionality important for later operation of the brake. In particular, as known in itself and also from DE 195 07 308 A1, such an opening may serve to receive elements of a reset device. Disc brakes are usually provided with an adjustment device which adjusts or adapts the brake clearance which changes over time. If the two brake pads of the disc brake have worn out, they must be replaced and at the same time the adjustment device must be returned to its original position, which is achieved using said reset device.

Advantageous embodiments are given in the dependent claims.

According to one embodiment of the method, the tool is first guided through the opening and is then transferred to the tool holder, e.g. by coupling to the tool holder which may also be provided with a rotary drive for the tool.

Preferably, the tool is transferred to the tool holder by a movement in the longitudinal direction of the opening.

According to a further embodiment of the method, during transfer of the tool, the tool holder protrudes at least partially into the free space between the two caliper portions.

A further embodiment of the method is characterized by the steps of transferring the tool to the tool holder and retracting the tool after it has been decoupled from the tool holder.

Preferably, in performing the machining, the brake caliper is fixedly positioned in a workpiece holder which can be moved in at least two movement axes relative to a stationary machine frame, wherein the workpiece holder is moved along one of these movement axes during machining of the support surface.

When such a movable workpiece holder is used, the tool holder itself may be arranged so as to be stationary and hence immovable on the machine frame. In this way it has no bearing play, which leads to a high accuracy in machining of the support surface.

According to a further embodiment, successively firstly a first support surface and then a second support surface aligned to this one is machined, wherein the opening is situated between the support surfaces. By this division of the support surfaces, it is possible to form a central element of the brake lever forming the application device as a fork which rests with a first leg against the one support surface and with a second leg against the other support surface.

For machining the two separate support surfaces, it is proposed that after coupling of the tool, a relative movement of the tool relative to the brake caliper takes place in the following order:
 a) starting from the starting point opposite the opening, towards one side of this opening and along the inside of the caliper rear wall,
 b) back into the region opposite the opening, and from there towards the other side of this opening and again along the inside of the caliper rear wall,
 c) back into the region opposite the opening.

According to a further embodiment of the method, the support surface or each support surface is machined into an H shape, forming two wider support surface portions and in between these a narrower middle portion.

In a further embodiment, it is proposed that the support surface or each support surface is machined as a partially cylindrical channel. Preferably, a bearing shell formed as a partially cylindrical channel is then placed on the machined support surface, and the brake lever may bear against the inside of said channel when the disc brake is mounted.

BRIEF DESCRIPTION OF THE DRAWINGS

Further advantages and details arise from the following description and with reference to the enclosed drawings. The drawings show:

FIG. 2 a longitudinal section through the portion of the brake caliper designated II in

FIG. 1;

DESCRIPTION OF PREFERRED EMBODIMENTS

Figure 1:
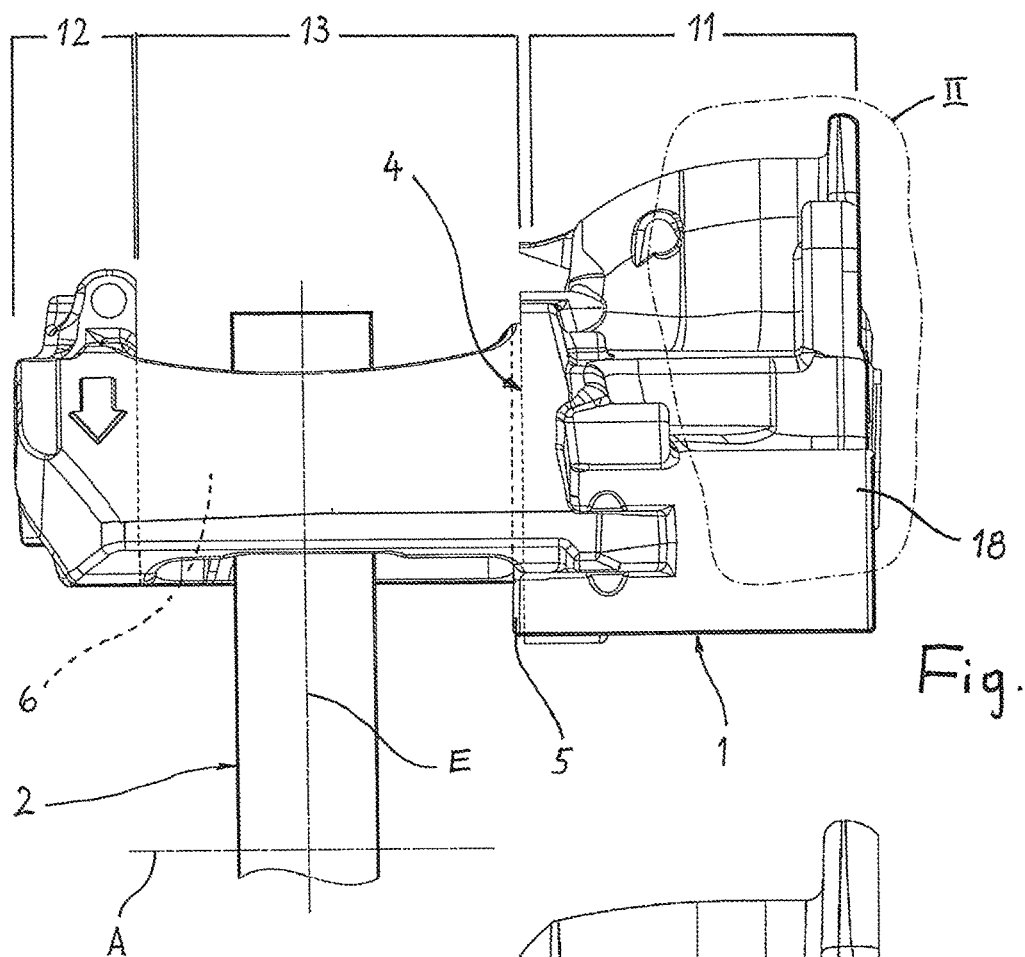
FIG. 1 in a side view, the brake caliper and brake disc of a truck disc brake.
Figure 2:
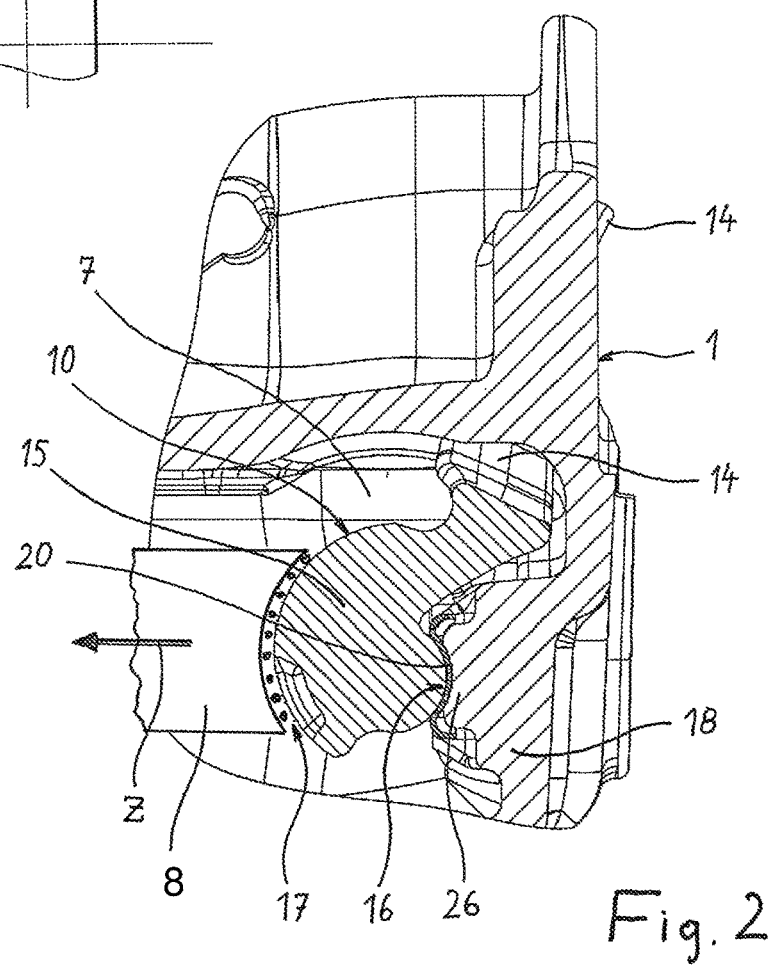

FIG. 1 and FIG. 2 show a brake caliper 1 of a disc brake, wherein the disc brake is here designed as a floating caliper or sliding caliper type used in truck brakes which are actuated by compressed air. The brake caliper 1, cast as a single piece, is composed of three portions. A first caliper portion 11, which is on the inside relative to the vehicle when the brake disc is mounted, is provided with a cavity 7 in its interior which is accessible via a mounting opening 4 offering space for a brake application device. A second caliper portion 12, which is on the outside relative to the vehicle when the brake is mounted, is arranged on the opposite side of the brake disc 2 of the disc brake. The two caliper portions 11, 12 are connected together by a bridge portion 13 which bridges the brake disc 2 and hence provides a free space 6 for at least part of the disc brake 2. The disc brake 2 rotates about axis A.

The brake caliper 1 is integral insofar as the two caliper portions 11, 12 and the bridge portion 13 consist of a single part, preferably by common casting in cast iron or cast steel. The cavity 7 of the first caliper portion 11 is open towards the free space 6 of the bridge portion 13. This opening serves amongst others as an mounting opening 4 and is relatively large, so that the brake application device can be mounted through this. The opening or mounting opening 4 is closed by a cover 5 when the brake has been assembled.

The drawing does not show the two brake pads of the disc brake. A first brake pad is situated on the right of the brake disc 2 in FIG. 1. This application-side brake pad is actuated directly by the brake application device arranged in the cavity 7 of the caliper portion 11, and thus pressed against the brake disc 2. The second brake pad is arranged in the second caliper portion 12 where it assumes a fixed position. This is the reaction-side brake pad.

The task of the brake application device is to amplify the brake forces generated by a force actuator, and transmit these in the application direction Z which extends parallel to the axis A of the brake disc 2. Components of the application device include a brake lever 10 mounted pivotably in the caliper portion 11 of the brake caliper 1, and a pressure piece 8 working in the direction towards the application-side brake pad on the inside relative to the vehicle. The pressure piece 8 has the form of a crosspiece extending transversely to the housing longitudinal direction. In the middle of the crosspiece 8, this is connected via a screw thread to a pressure plunger which bears against the application-side brake pad of the disc brake and can thus press this against the brake disc 2.

The pivotable brake lever 10 is formed as a fork and consists of a lever arm 14 and an application shaft 15 divided into two portions. The application shaft 15 bears against a caliper rear wall 18 which closes the cavity 7 on the side facing away from the brake disc. This support against the caliper rear wall 18 of the brake caliper takes place by means of a partially cylindrical pivot bearing 16 in the form of a half shell.

As part of the pivot bearing 16, a bearing shell 21 is arranged between each of the two portions of the application shaft 15 and a support surface 20 formed on the inside of the caliper rear wall 18. The application shaft 15 of the brake lever 10 bears only on the bearing shell 21 which, like the support surface 20, is formed as a partially cylindrical channel. For this, the application shaft 15 is also formed so as to be partially cylindrical in the contact region, with a radius which is the same as the radius on the inside of the curved bearing shell 21.

In the other direction, i.e. in the application direction Z and hence towards the brake pads or brake disc 2, the application shaft 15 bears pivotably against the pressure piece 8 via a further pivot bearing 17. For this, the pressure piece 8 has a support region in the form of a half shell. The further pivot bearing 17 may be configured as a roller bearing or as a plain bearing.

To achieve a high application force, the application shaft 15 is mounted eccentrically. The pivot bearing 16, which bears against the bearing shell 21 and hence indirectly against the brake caliper 1, has a pivot axis which is offset in height compared with the pivot axis of the further pivot bearing 17 arranged between the application shaft 15 and the pressure piece 8.

When the eccentrically contoured application shaft 15 is turned, therefore, a forward movement of the pressure piece 8 occurs in the application direction Z, whereby the brake exerts a braking force on the brake pads.

The lever arm 14 serves to twist the application shaft 15 on which it is integrally formed. Close to its free end, said arm has a support site against which the force actuator of the disc brake works. For disc brakes actuated by compressed air, this force actuator is a pneumatic brake cylinder which is supplied with compressed air from the compressed air system of the vehicle.

The brake lever 10 as a whole is fork-shaped, since it branches into two legs starting from the lever arm 14 arranged on the pivot center line. The first leg is the first portion of the application shaft 15, and the second leg is the second portion of the application shaft 15. Between the two portions, the brake lever 10 has a free space. This, together with the center of the pressure piece 8 provided with a threaded bore, offers sufficient space for an adjustment device which can compensate for the brake wear occurring over time and correct the brake clearance. The components of the adjustment device include a drive element, and output element reducing the brake clearance, a one-way coupling and an overload member. The output element of the adjustment device is a spindle. This is provided with an external thread which is screwed into the threaded bore in the center of the pressure piece 8. Most components of the adjustment device are arranged on one adjustment axis. The adjustment axis lies on the application axis Z and at the same time extends perpendicular to the plane E in which the brake disc 2 extends.

Since the application shaft 15 is divided into two shaft portions, at least two support surfaces 20 and two bearing shells 21 are also provided for supporting the shaft portions. Of these, one support surface 20 with its bearing shell 21 lies on one side of the application axis Z, and the other support surface 20 with its bearing shell lies on the other opposite side of the application axis Z.

An opening 25 is situated in the caliper rear wall 18 of the brake caliper, in the middle between the two support surfaces 20 and preferably also on the adjustment axis of the adjustment device. The opening 20 is preferably round and preferably configured as a bore. Since the opening 25 is formed in the caliper rear wall 18, when the brake is mounted ready for operation, it offers space for a reset element of a reset device. When the brake pads of the disc brake are worn out, they must be replaced. Then the adjustment device must be returned to its original position, which is achieved using said reset device. The reset element of this reset device is situated in the opening 25 of the caliper rear wall 18 and is provided with key flats, preferably on the outside of the caliper rear wall 18, on which a corresponding tool can be placed for resetting the brake.

Figure 3:
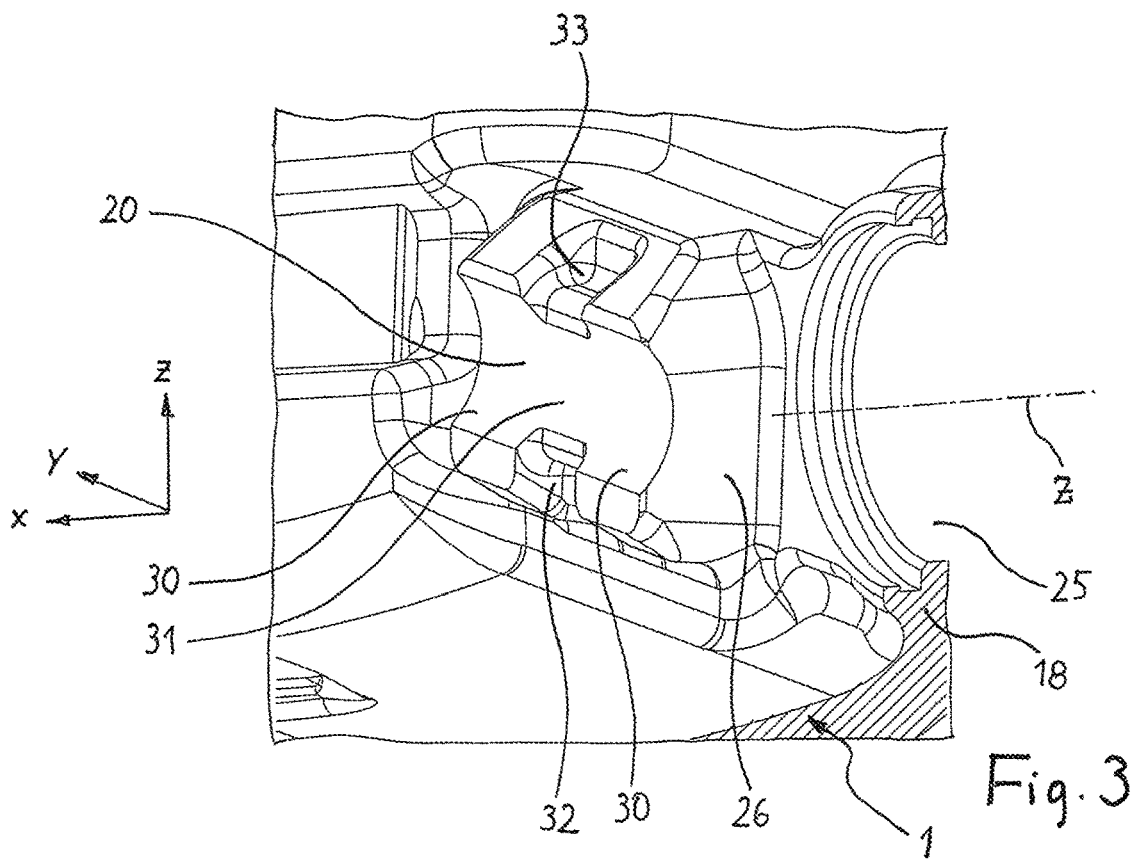
FIG. 3 in a perspective view, a support surface on the inside of the caliper rear wall of the brake caliper.
Figure 4:
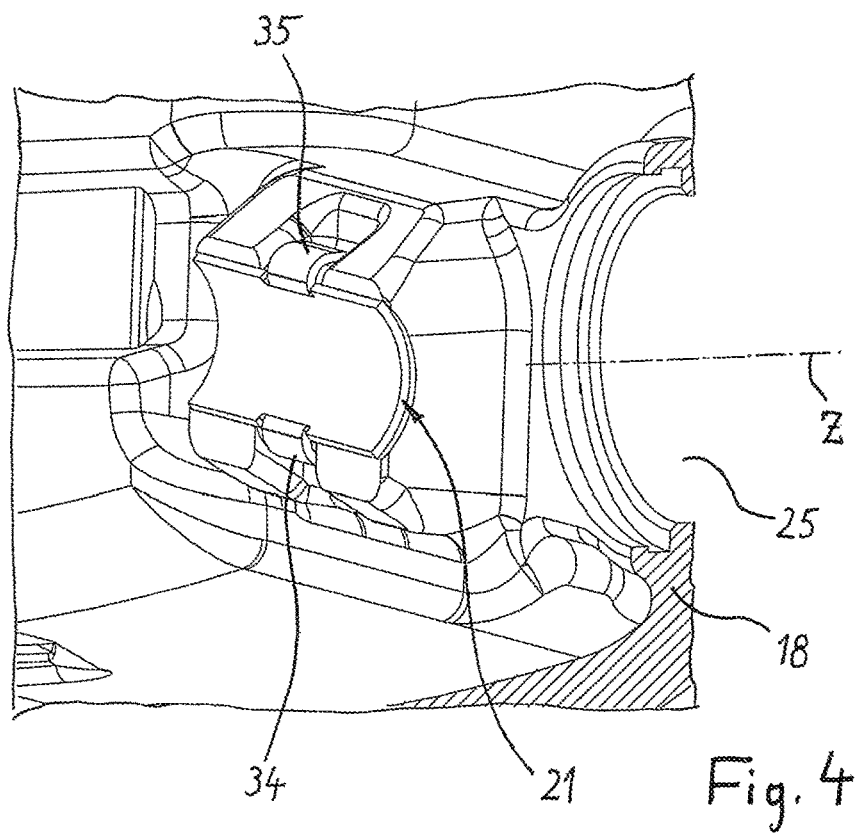
FIG. 4 the support surface including a bearing shell placed thereon.
Figure 5:
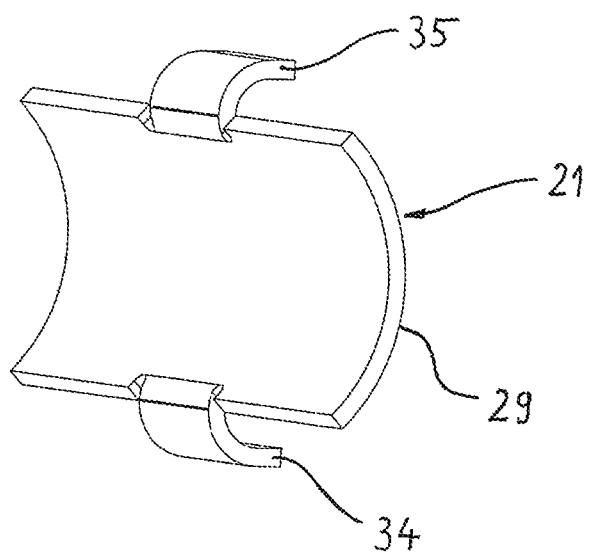
FIG. 5 the channel-like bearing shell in separate, perspective view.
Figure 6:
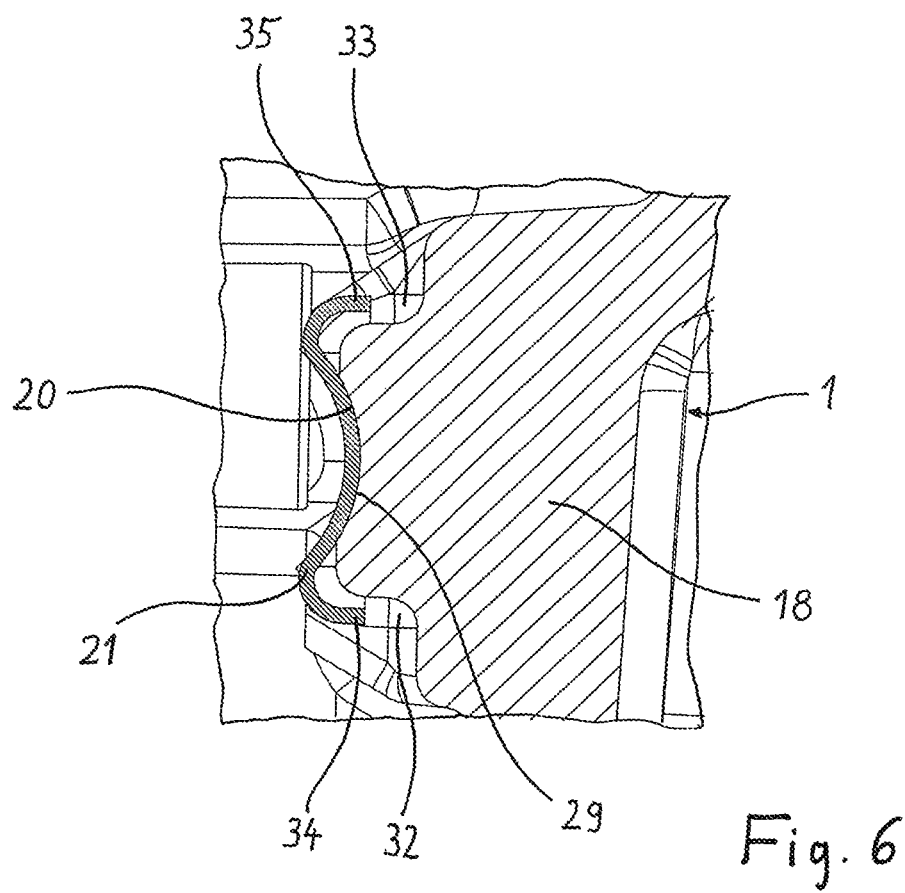
FIG. 6 a further longitudinal section through the caliper rear wall, support surface and bearing shell placed thereon.

According to FIG. 3, the support surfaces 20 on which the brake force of the disc brake is applied are each formed as a partially cylindrical, curved channel or shell. The two support surfaces 20 are arranged in mutual alignment. The common reference axis of the radii of their partially cylindrically curved contours runs parallel to the plane E in which the brake disc extends.

FIG. 3 furthermore shows that each support surface 20 is situated on a plateau 26 protruding inwardly relative to the caliper rear wall 18 and cast during casting of the caliper.

Each support surface 20 is machined as an H shape and consists of two support surface portions 30 of greater channel width, and a middle portion 31 arranged in between and of smaller channel width. The narrower middle portion 31 is created by two notches 32, 33 in the plateau 26 produced during the casting process. A wing-shaped tab 34, 35 of the bearing shell 21 protrudes into each notch 32, 33.

Each bearing shell 21 consists of an originally flat metal plate produced by punching and forming. The partially cylindrically curved outside 29 lies superficially against the support surface 20, wherein the radius of the part cylinder is the same.

The outside 29 of the bearing shell 21 extends further in the circumferential direction than the narrow middle portion 31 of the support surface 20. In this way, the bearing shell 21 may wander in the circumferential direction on the support surface 20. This movement possibility is however limited in both circumferential directions, since the end regions of the tabs 34, 35 then impact against the cast notches 32, 33. The tabs 34, 35 therefore serve as stops for limiting the movement possibility of the bearing shell 21 in the circumferential direction.

It is furthermore possible that the tabs 34, 35 also limit the longitudinal movement of the partially cylindrical bearing shells 21, since the tabs 34, 35 are narrower in the axial direction of the partially cylindrical bearing shell 21 than the cast notches 32, 33.

The two support surfaces 20 cannot be produced with the required precision by casting. Rather, it is necessary to provide the precise, partially cylindrical contour for the support surfaces 20 by a material removal tool and/or a grinding tool. For this, a suitable machining tool must be guided along the support surfaces 20. This tool may for example be a rotating milling tool with partially circular milling cutter. However, the one-piece design of the brake caliper 1 restricts the possibilities for moving a machining tool into the cavity 7 of the brake caliper housing in order to machine the two support surfaces 20 on the plateaus 26.

However, with the application of the method described in FIGS. 7a-7d, it is possible to machine the interior of the brake caliper.

FIGS. 7a-7d each show a machine tool 50 for machining the brake caliper 1 and in particular also the support surfaces 20, and in some cases further inner faces of the brake caliper 1. The machine tool 50 has at least three main elements in the production process described here:

1. The machine tool 50 has a workpiece holder in which the brake caliper 1 can be fixedly positioned, e.g. by clamping the brake caliper. The workpiece holder is movable in at least two movement axes x, y relative to the stationary machine frame 54 of the machine tool 50. The movement axis x extends in the application direction Z of the clamped brake caliper. Axis y extends at right angles to axis x and in the longitudinal or alignment direction of the two support surfaces 20, or parallel to this longitudinal or alignment direction. Preferably, the workpiece holder can also be positioned along a third axis z which stands perpendicular to the two axes x, y.
2. The machine tool 50 furthermore has a tool holder 52. This is here arranged so as to be stationary on the machine frame 54 of the machine tool. The tool holder 52 is configured for precisely holding and for driving the machining tool 55 in rotation. The tool 55 is here a face cutter but may also be a form-grinding tool.
3. The machine tool 50 furthermore has a tool gripper 53. The tool gripper 53 is configured, preferably by means of a pneumatic drive, to guide the machining tool 55 from its standby position by means of a telescopic device up to the tool holder 52, and transfer it so that the tool 55 can then be locked onto the tool holder 52. The lock takes place for example by clamping the tool 55 in the tool holder 52. After transfer, the tool gripper 53 is withdrawn by means of the telescopic device back to the standby position. The tool gripper 53 is furthermore configured, after machining of the support surfaces 20, to grip the tool locked onto the tool holder 52 and, after unlocking this, transport it back to the standby position. In both cases, the tool gripper 53 performs an exclusively rectilinear movement between the standby position and the tool holder 52.

Figure 7A:
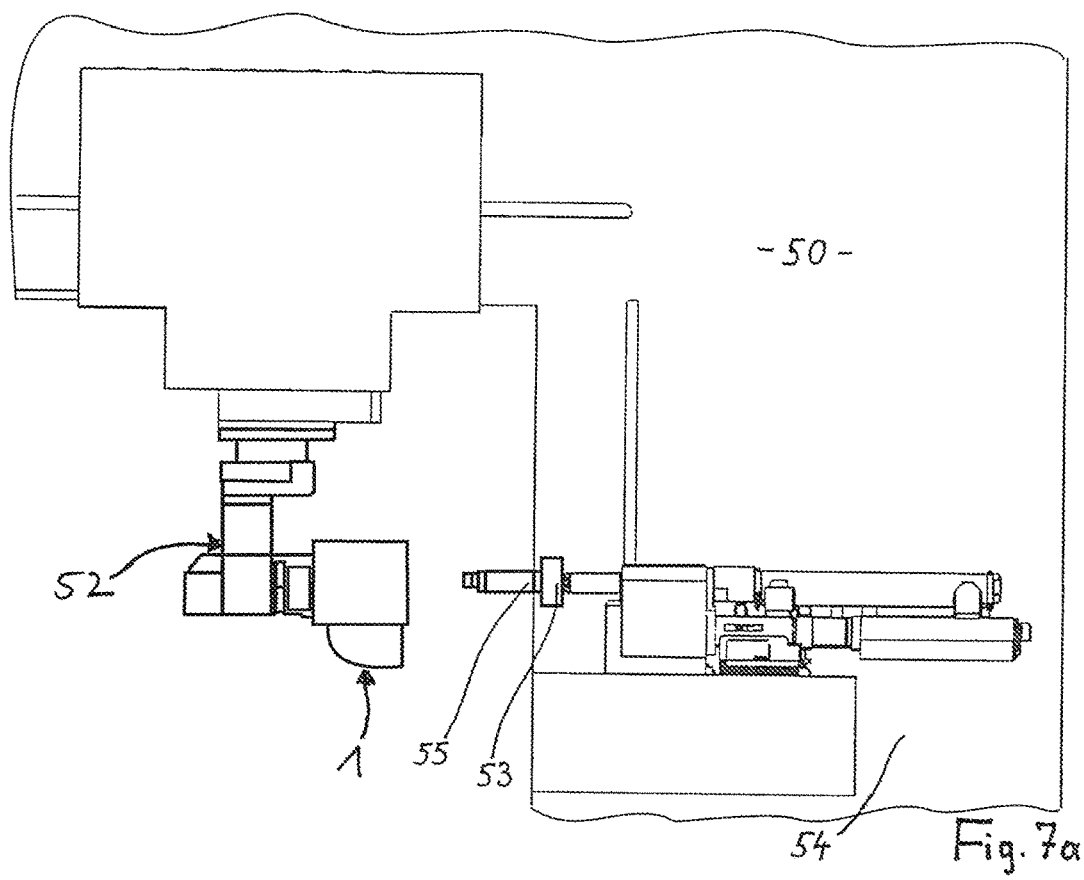
FIGS. 7a-d various steps in machining the interior of the brake caliper by means of a milling cutter, each showing a machine tool with workpiece holder, brake caliper positioned thereon, a stationary tool holder and a device for transferring the milling cutter to the tool holder.

According to FIG. 7a, the brake caliper 1, previously cast as one piece, is positioned in a workpiece holder which is movable in two or three axes. The workpiece holder then presents the brake caliper 1 so that the tool holder 52, which is arranged so as to be stationary on the machine tool 50, enters the free space 6 in the bridge portion 13 of the brake caliper into which, when the brake is ready for operation, the brake disc 2 extends at least partially. This presentation ends when the tool receiver of the tool holder 52 is situated in front of or inside the opening 4 of the brake caliper 1. This situation is shown in FIG. 7a.

Figure 7B:
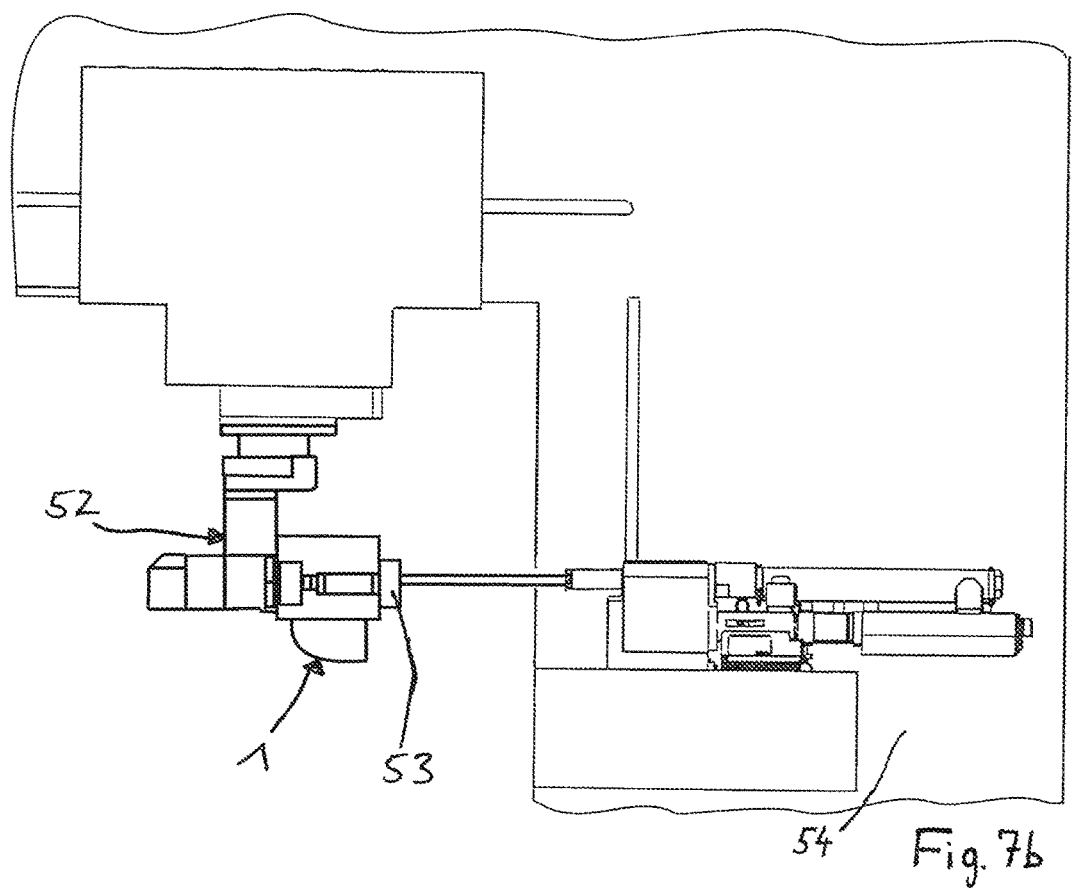
Figure 7C:
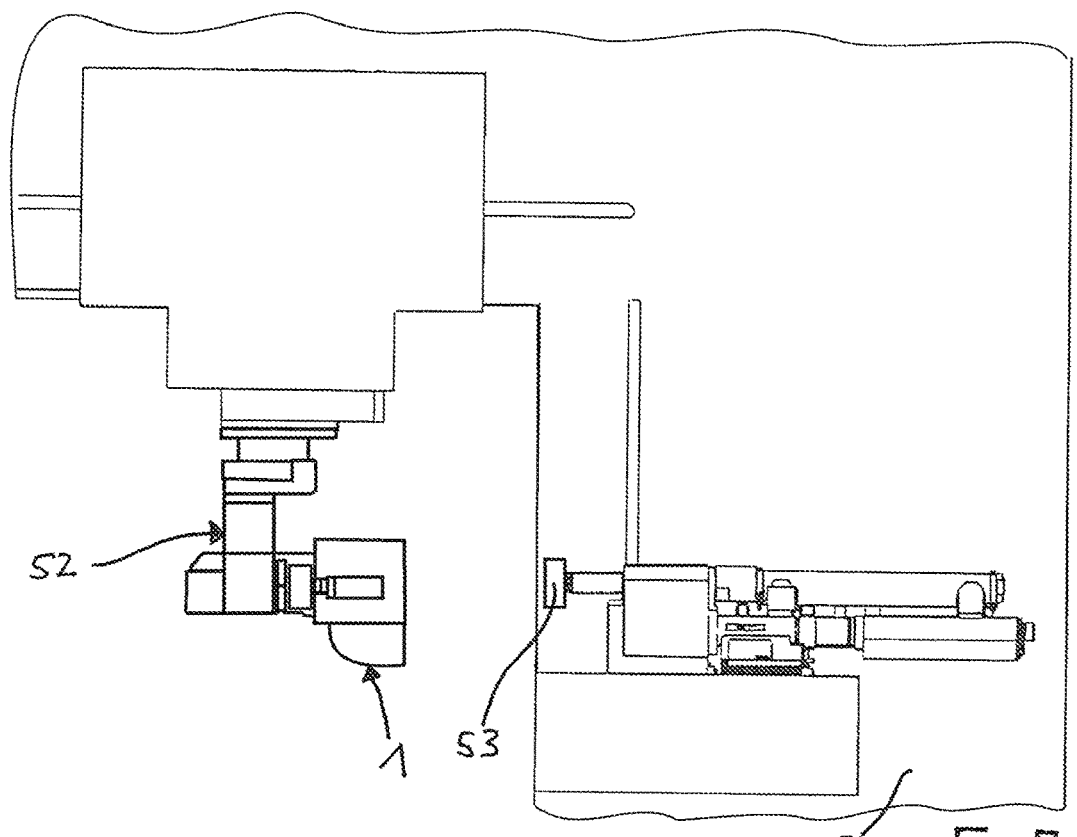

According to FIG. 7b, the tool gripper 53 on which the tool 55 is provisionally arranged is then activated. In a rectilinear movement, the tool gripper 53 guides the tool 55 through the rear opening 25 and through the cavity 7 of the brake caliper into the tool receiver of the tool holder 52. The tool 55 is then locked onto the tool holder 52, e.g. in its chuck. Then the tool gripper 53 releases the tool and returns to its standby position. This is illustrated in FIG. 7c. The tool is now at least mainly inside the cavity 7 of the brake caliper and the tool holder 52 is mainly inside the free space 6 in front of the cavity 7.

Now the two support surfaces 20 are machined from the free space 6 and through the opening 4 by means of the milling cutter 55 rotating in the tool holder 52. The relative movement in the y direction (FIG. 3) necessary for the advancing the machining is achieved exclusively by the movement of the workpiece holder, since the tool holder 52 is stationary and immovable. In detail, relative movements of the milling cutter are performed in relation to the caliper rear wall 18 in the following order:

a) starting from a starting point opposite the opening 25, towards one side of this opening 25 and along the inside of the caliper rear wall 18,
b) back into the region opposite the opening 25, and from there towards the other side of this opening 25 and again along the inside of the caliper rear wall 18,
c) back into the region opposite the opening 25.

Figure 7D:
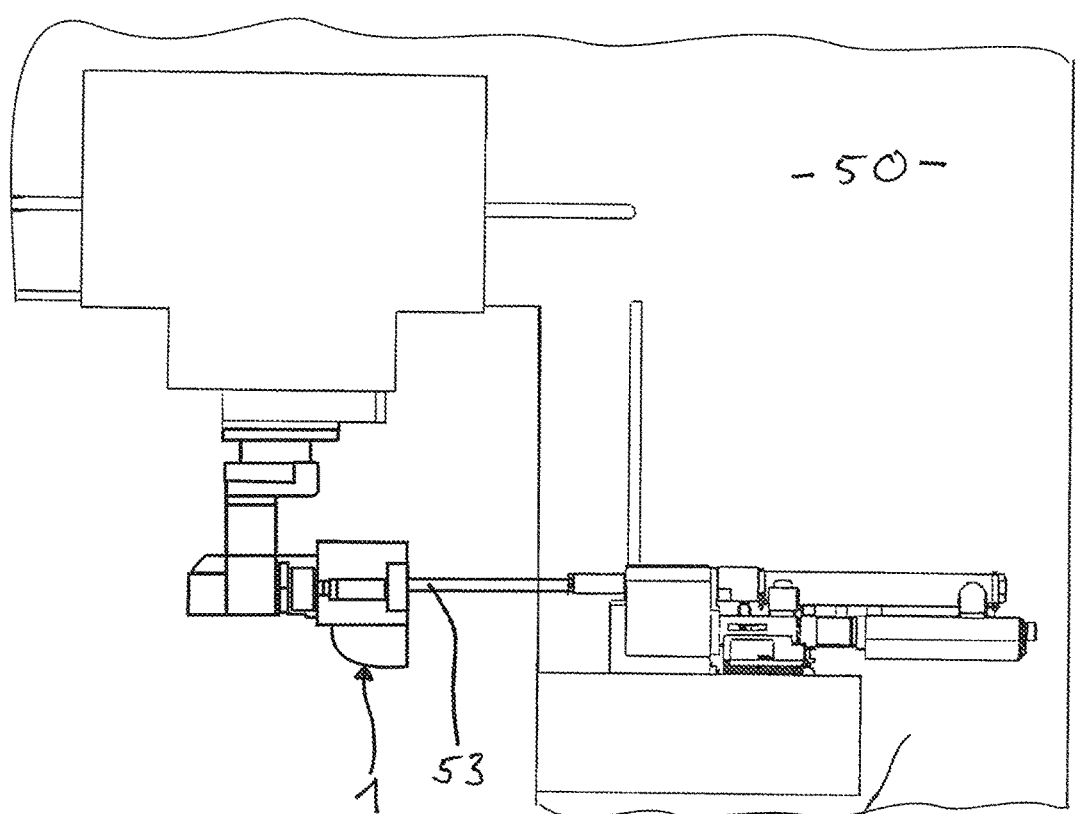

Then according to FIG. 7d, the tool gripper 53 again extends through the opening 25 and the cavity 7 of the brake caliper up to the tool 55 and grips this. At the same time or subsequently, the chuck of the tool holder 52 releases the tool. The tool gripper 53 with the tool 55 then returns to the standby position.

The machining and preferably milling of the support surfaces 20 is then ended, and further internal or external machining of the brake caliper 1 can then begin, either in the same clamping of the brake caliper 1 or in another clamping or in another machine tool.

The steps of the method may evidently also be achieved if the workpiece holder is fixed removably in the machine tool, and the tool holder is moved. Also the combination of movement of tool holder and workpiece holder is conceivable.

LIST OF REFERENCE SIGNS

1 Brake caliper
2 Brake disc
4 Opening, mounting opening
5 Cover
6 Free space
7 Cavity
8 Pressure piece, crosspiece
10 Brake lever
11 Caliper portion
12 Caliper portion
13 Bridge portion
14 Lever arm
15 Application shaft
16 Pivot bearing
17 Pivot bearing
18 Caliper rear wall
20 Support surface
21 Bearing shell
25 Opening
26 Plateau
29 Outside
30 Support surface portion
31 Middle portion 32 Notch
33 Notch
34 Tab
35 Tab
50 Machine tool
52 Tool holder
53 Tool gripper
54 Machine frame
55 Tool
A Rotary axis of brake disc
E Plane of brake disc
x Axis
y Axis
z Axis
Z Application direction, adjustment axis

What is claimed is:

1. Method for machining the interior of a brake caliper (1) of a disc brake, on which brake caliper (1) are formed:
   a first caliper portion (11) on one side of a brake disc of the disc brake,
   a second caliper portion (12) on an opposite side of the brake disc, and
   a bridge portion (13) connecting the first and second caliper portions (11, 12) and providing a free space (6) for at least a part of the brake disc,
   wherein the first caliper portion is provided with a cavity (7) for receiving a brake application device, which cavity (7) comprises a mounting opening (4) contiguous with the free space (6), and which cavity (7) extends from the mounting opening (4) as far as a caliper rear wall (18), wherein on the rear wall (18), at least one support surface (20) is formed, on which braking forces of the disc brake act during braking, wherein the machining of the at least one support surface (20) is carried out from the free space (6), and for this purpose, a tool (55) is brought into the cavity (7) from outside the brake caliper (1), characterized in that the tool (55) is guided into the cavity (7) through an opening (25) other than the mounting opening (4), whereupon the tool (55) is then transferred to a tool holder (52).

2. Method according to claim 1, characterized in that after completing the machining, the tool (55) is withdrawn from the cavity (7) through the opening (25) other than the mounting opening (4).

3. Method according to claim 1, characterized in that the opening (25) through which the tool (55) is guided is located in the caliper rear wall (18).

4. Method according to claim 3, wherein the at least one support surface comprises: (i) a first support surface situated on one side of the opening (25) other than the mounting opening (4) and (ii) a second support surface aligned thereto and on an opposite side of the opening (25) other than the mounting opening, and
wherein successively, the first support surface and the second support surface are machined.

5. Method according to claim 4, characterized in that after the transfer of the tool (55) to the tool holder (52), a relative movement of the brake caliper (1) relative to the tool (55) takes place in the following order:
   a) starting from a starting point in a region opposite the opening (25) other than the mounting opening, moving towards the one side of this opening (25) and along the inside of the caliper rear wall (18),
   b) moving back into the region opposite the opening (25), and from there moving towards the opposite side of this opening (25) and again along the inside of the caliper rear wall (18), and
   c) moving back into the region opposite the opening (25).

6. Method according to claim 1, characterized in that the tool (55) is guided through the opening (25) other than the mounting opening (4) via a linear movement of the tool (55).

7. Method according to claim 1, characterized in that the tool holder (52) is provided with a rotary drive for the tool (55).

8. Method according to claim 1, characterized in that the tool (55) is transferred to the tool holder (52) by a movement of the tool (55) in the longitudinal direction of the opening (25) other than the mounting opening (4).

9. Method according to claim 1, characterized in that during the transfer of the tool (55) to the tool holder (52), the tool holder (52) protrudes at least partially into the free space (6) between the first and second caliper portions (11, 12).

10. Method according to claim 1, characterized by the step withdrawing the tool (55) from the cavity (7) after the tool (55) has been decoupled from the tool holder (52).

11. Method according to claim 1, characterized in that the brake caliper (1) is fixedly positioned in a workpiece holder which can be moved in at least two movement axes (x, y) relative to a stationary machine frame, and the brake caliper (1) is moved along one of these machining axes during the machining of the at least one support surface (20).

12. Method according to claim 11, characterized in that the tool holder (52) is arranged so as to be stationary on the machine frame.

13. Method according to claim 1, characterized in that the at least one support surface (20) is machined into an H shape forming two wider support surface portions (30) and in between these a narrower middle portion (31).

14. The method according to claim 1, characterized in that the at least one support surface (20) is machined as a partially cylindrical channel.

15. Method according to claim 14, characterized in that a bearing shell (21) formed as a partially cylindrical channel is placed on the machined at least one support surface (20).

16. Method according to claim 1, characterized in that the tool (55) is transferred to the tool holder (52) by means of a tool gripper (53) in a rectilinear movement.

* * * * *